Aug. 12, 1924.

W. H. LIEBER

FLOW INDICATOR

Filed Dec. 27, 1919

1,504,770

Inventor
W. H. Lieber
by
Attorney

Patented Aug. 12, 1924.

1,504,770

UNITED STATES PATENT OFFICE.

WILLIAM H. LIEBER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

FLOW INDICATOR.

Application filed December 27, 1919. Serial No. 348,503.

*To all whom it may concern:*

Be it known that WILLIAM H. LIEBER, a citizen of the United States of America, residing at West Allis, in the county of Milwaukee and State of Wisconsin, has invented a certain new and useful Improvement in Flow Indicators, of which the following is a specification.

This invention relates in general to apparatus for indicating, in a visual manner, the presence or absence of flow of fluid through a conduit, and has more particular relation to devices for visually indicating the presence or absence of flow of fluid in a lubricating system, and to a certain degree, the volume of such flow.

It is often desirable to have a sight flow indicator capable of giving a desired indication of the flow of fluid when the pipe line is disposed in other than a horizontal position. In fact, it is extremely desirable to have an indicator, of such design and construction that a visual indication is readily apparent independently of whether the particular indicator is disposed in a horizontal, vertical or inclined pipe line, and further, independently of the direction of flow through the pipe line.

It is an object of this invention to provide apparatus of this general character of improved design and construction capable of readily indicating the flow of fluid in either direction through a pipe line.

It is a further object of this invention to provide apparatus of this general character of improved design and construction capable of readily indicating the flow of fluid in either direction in a pipe line, and this independently of the direction in which the pipe line extends.

These and other objects and advantages are attained by this invention, the various novel features of which will appear from the description and drawings disclosing several embodiments of such invention, and will be more particularly pointed out in the claims.

In the accompanying drawings, Fig. 1 is a longitudinal section, along the plane of the line I—I of Fig. 2, of an indicator embodying features of this invention and disposed in a horizontal pipe line.

Figure 1:
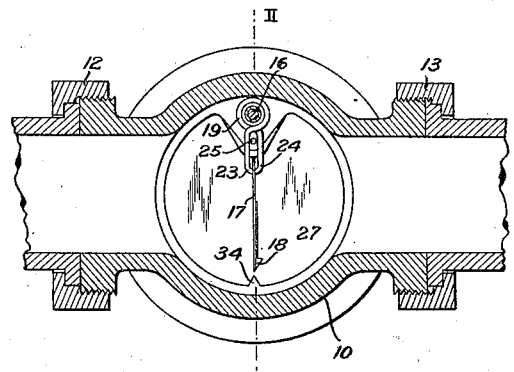
Figure 2:
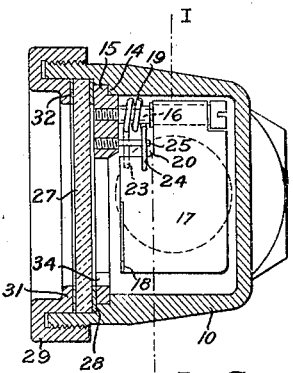
Fig. 2 is a vertical section along the line II—II of Fig. 1.
Figure 3:
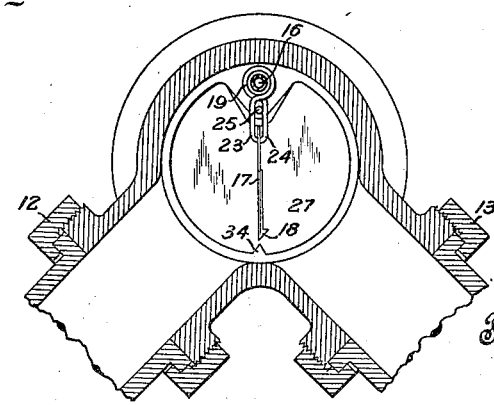
Fig. 3 is a view similar to Fig. 1, but with the indicator associated with an angle casing or coupling for insertion in or connection between pipe sections disposed at an angle to each other.

In the form of the invention disclosed in Figs. 1, 2 and 3, a casing 10 is provided with means for coupling or insertion between two sections of horizontally disposed and alined pipe, the couplings being indicated generally 12 and 13. The casing 10 is formed with an interior shoulder 14, preferably of circular outline, for the reception and support of an angular supporting collar 15 having a projection or enlargement at its rear side, this enlargement being preferably, either wholly or in part, in the form of a rod or stud 16 threaded into and held rigidly therein. A vane 17, preferably of sheet metal has its upper edge bent in a generally circular form to receive the rod or stud 16 upon which the vane is free to swing or pivot. The front edge of the vane 17 is turned over or otherwise suitably formed to present an indicator which may be, and preferably is, if generally arrow-shape, with the point extending downwardly, as indicated at 18.

The vane 17 is held in a neutral position, in this particular form of the invention, in a vertical position, by a double-acting coil spring 19 wrapped about the screw or stud 16 adjacent a cut-away portion of the vane 17, as indicated at 20. The ends of the spring 19, indicated at 23 and 24, are crossed at the lower side of the pivotal stud 16 so as to embrace and engage the stop 25, preferably in the form of a pin secured to the rear side of the supporting collar 15, and the body portion of the vane 17 adjacent the cut-away portion 20. It will be apparent that all parts of the pivotally mounted and spring-held vane 17, are operatively mounted upon and held in place by and upon the annular supporting collar 15.

The front end of the chamber or casing 10 is closed by a transparent element, preferably in the form of a sight glass 27, clamped against a flexible washer 28 which is held in place on a shouldered portion of the casing 10 and front face of the supporting collar 15, by a clamping collar 29, preferably having threaded engagement with an annular portion of the outside of the casing 10 and having a substantial bearing portion 31 in engagement with a flexible washer 32 which properly distributes the pressure of the clamping collar upon the sight glass 27.

Under condition of no flow through the pipe line and the indicator casing, the indicating vane 17 occupies the position generally shown in Fig. 1, wherein the arrow 18 is opposite a zero indicator 34, preferably formed on the collar 15. The vane is held in this neutral position by the spring 19, and this is the case independently of whether the indicator is mounted in a vertical, horizontal or inclined pipe line. On the occurrence of flow of oil or other fluid through the pipe line and the indicator casing, the indicating vane 17 is moved by the fluid in the direction of flow against the resistance of the spring 19, thus giving an indication of the presence of flow, and, to a greater or less degree, of the volume of such flow. It will be apparent that this indication is just as readily secured whether the flow is in one direction or the other, due to the fact that the spring 19 is double-acting and the vane is as readily movable in one direction as another.

In Fig. 3, the indicator is associated with a casing of L or right angle-shape, and, due to the fact that the indicating vane 17 is resiliently held in a neutral position by the double acting spring 19, the vane is effective to produce a visual indication of the presence of flow in either direction through the angle casing. It will be noticed that, through the use of the invention in this particular form, devices embodying the invention readily not only serve as indicators, but have the function of replacing an ordinary coupling in a pipe line.

Figure 4:
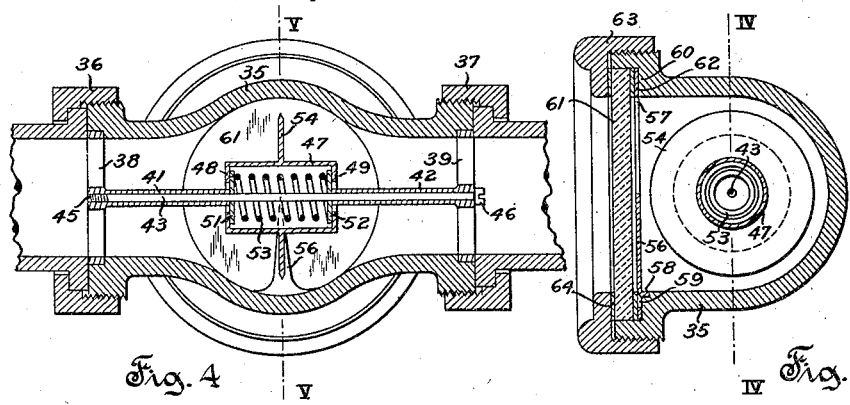
Fig. 4 is a view similar to Fig. 1 of a modification of the apparatus disclosed in Fig. 1, the section being taken along the line IV—IV of Fig. 5.
Figure 5:
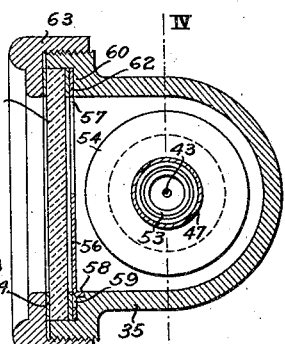
Fig. 5 is a vertical section along the line V—V of Fig. 4.

Figs. 4 and 5 illustrate a somewhat modified form of the general invention disclosed in Figs. 1, 2 and 3. In accordance with the showing therein, the casing 35, which may be of somewhat the same general shape as the casing 10 of Fig. 1, is formed for coupling or connection in a horizontal pipe line, the coupling elements being indicated generally at 36 and 37. Collars or spiders 38 and 39 are secured in the opposite ends of the casing in longitudinal alinement, preferably by being threaded therein, these collars being apertured to such an extent as to offer the least impediment to the flow of fluid through the casing, and being provided with inwardly projecting tubes or sleeves 41, 42, integral with or attached to the collars 38, 39 at the central points thereof. These collars 38, 39 may be held in position and suitably alined by a rod 43, which may be threaded at one end, as indicated at 45, and provided with a screw head at the other end, as indicated at 46, this arrangement providing for readily securing the rod and the parts associated therewith.

Mounted upon and slidable relatively to the rod 43 and the associated sleeves 41, 42, is a tubular element 47 constituting a sleeve-like casing, preferably of sheet metal, having the opposite ends bent over in the form of inwardly extending flanges, as indicated at 48, 49, which, together with the inner ends of the sleeves 41, 42, provide abutments for substantially rigid washer-like members or collars 51 and 52 slidable upon the rod 43 and between which a compression spring 53 is disposed. This spring and its mounting are effective, under normal conditions, to maintain the tubular element or sleeve 47 in a central or neutral position relatively to the collars 38 and 39 in the ends of the casing. The casing 47 is provided with a vane 54, preferably of sheet metal, and integral with or suitably attached, as by brazing, to the exterior of the casing 47. This vane has its front edge, at least a portion thereof, so formed as to present an indicating element, which, in connection with a fixed indicating element, preferably in the form of a pointer 56, is effective when the indicators are opposite each other, to indicate the neutral or no-flow position of the vane 54. This indicator 56 is formed integral with a perforated disc 57 positioned as by a lug 58 cooperating with a recess 59 in the casing, and held in place on an interior shoulder 60 of the casing. The disk 57 is held against its seat, and the front of the casing 35 is closed by a sight glass 61 clamped against the disk 57, through the intermediary of a flexible washer 62, the sight glass being held in position, so as to form a transparent and liquid-tight seal for the casing, by means of a screw collar 63, of approximately the same general shape as the collar 29 of Fig. 1, a flexible washer 64 being inserted between the collar and the glass to evenly distribute the pressure on the latter.

It will be apparent that with the parts properly disposed in operative position, the vane 54 occupies a neutral position under conditions of no flow through the conduit with which the indicator is associated, with the front edge of the vane preferably in line with the fixed indicating pointer 56. On the flow of fluid through the pipe line and the indicator, the fluid is effective to displace the vane 54 in the direction of flow to such an extent as to permit the indicator associated with the vane to give a visual indication of the presence of flow, and also, to a considerable extent, the volume of flow. In the displacement of the vane 54 from its neutral position, as for instance, toward the left, as viewed in Fig. 4, the interior flange abutment 49 on the tubular casing 47 engages the collar member 52 which, acting upon the spring 53, serves to compress the latter against the collar member 51 which is held in position through engagement with the end of the sleeve 41. Thus the spring is effective to resist displacement of the vane to a greater or less extent, depending upon the strength of the spring and other features of the design of the apparatus. On the other hand, on the occurrence of flow toward the right, as viewed in Fig. 4, the interior flange abutment 48 on the casing 47 engages the collar member 51 and acts to compress the spring 53 against the collar member 52 which is held against the interior flange abutment 42 on the tubular casing, thus offering a resistance to the movement of the vane.

It will be apparent that this indicating apparatus of Figs. 4 and 5 is fully effective to indicate flow in either direction through either a vertically disposed pipe line or a pipe line disposed at any angle to the vertical. Likewise, it will be apparent that in this form of indicating apparatus, the mounting of the vane on the rod or shaft 43 is such as readily permits movement of the vane, either reciprocating or rotating.

It should be understood that it is not desired that the invention claimed be limited to the exact details of construction shown and described, for obvious modifications may occur to a person skilled in the art.

It is claimed and desired to secure by Letters Patent:

1. A flow indicator, comprising a casing having a flow opening therethrough and including a transparent window affording a view of the interior of the casing, and a movable element spaced from the walls of said casing and having a part associated therewith visible through said window, said movable element being resiliently and yieldably held in neutral position in said casing and movable in either direction in response to the flow of fluid through said casing and irrespective of the position of said casing.

2. A flow indicator, comprising a casing having a flow opening therethrough and including a transparent window affording a view of the interior of the casing, a support removably held in position entirely within said casing, an element carried by said support and movable in either direction from a neutral position, and means for resiliently and yieldably holding said element in neutral position irrespective of the position of said casing and permitting movement thereof in either direction in response to flow of fluid through said casing, said movable element, said support and said holding means being removable from said casing as a unit.

3. A flow indicator, comprising a casing having an open side, and entrance and outlet openings for the flow of fluid through said casing and past said open side, a removable transparent cover for said open side, a support removably held in position entirely within said casing, a vane movably mounted upon said support and having a part associated therewith visible through said cover, a double-acting spring operatively associated with said support and said vane for yieldingly maintaining said vane in a neutral position irrespective of the position of said casing, said vane being removable from neutral position in response to flow of fluid in either direction through said casing, and said vane and said spring being removable from and insertible in said casing as a unit.

4. A flow indicator, comprising a casing having a flow opening therethrough and including a transparent window affording a view of the interior of the casing, and a movable element within said casing, said element being yieldingly maintained in a neutral position irrespective of the position of said casing and being movable in a straight line in either direction from neutral position in response to flow of fluid through said casing.

5. A flow indicator, comprising a casing having a flow opening therethrough and an additional opening therein, a transparent cover for said latter opening, a movable element within said casing in the path of flow therethrough and having a part associated therewith visible through said cover, guiding means for restraining the movement of said element to substantially straight line movement, and means for yieldingly maintaining said element in a neutral position within and irrespective of the position of said casing and permitting movement in either direction from said neutral position in response to flow of fluid through said casing.

6. A flow indicator, comprising a casing having a flow opening therethrough and an additional opening therein, a transparent cover for said opening affording a view of the interior of said casing, a movable element within said casing in the path of flow therethrough and having a part associated therewith visible through said cover, guiding means for limiting the movement of said element to substantially straight line movement, and double-acting spring means operatively associated with said movable element and effective to cause said movable element to normally occupy a neutral position and permitting movement of said element in either direction from said neutral position in response to flow of fluid through said casing.

7. A flow indicator, comprising a casing having entrance and outlet openings for the flow of fluid therethrough and including a window of transparent material affording a view of the interior of said casing, a movable element within said casing having a part associated therewith visible through said window, means for guiding said movable element and restraining its movement to substantially straight line movement, said means comprising guiding means operatively supported in position in said entrance and outlet openings, and a spring cooperative with abutments associated with said movable element and said guiding means and effective to normally maintain said movable element in a neutral position while permitting movement thereof in either direction from said neutral position in response to flow of fluid through said casing.

8. A flow indicator, comprising a casing having an open side and having entrance and outlet openings in substantial alinement, a transparent window normally closing said open side, a movable vane within said casing and having a part associated therewith visible through said window, supporting means for said vane in the form of a tubular element having interior flanges at the ends thereof, movable members within said tubular element cooperative with said interior flanges, a double-acting spring within said tubular element disposed between and cooperative with said movable members, guiding means for said tubular element effective to constrain movement of said vane to a substantially straight line, said guiding means being formed with abutments cooperative with said movable members, and said spring being effective through said movable members, the interior flanges on said tubular element and the abutments on said guiding means to normally maintain said vane in a neutral position while permitting movement thereof in either direction from said neutral position in response to flow of fluid through said casing.

9. A flow indicator, comprising a casing having a flow opening therethrough and including a transparent window affording a view of the interior of the casing, a movable element within and in the normal path of flow through said casing and having a part associated therewith adjacent the normal path of flow visible through said window, and means located within said casing for resiliently and yieldably holding said movable element in neutral position, said element being movable to either side of neutral position in response to the flow of fluid through said casing and independently of the general direction of fluid flow through said casing.

10. A flow indicator, comprising a casing having a flow opening therethrough, a movable element within said opening and spaced from the walls of said casing, and means for yieldingly urging said element toward a neutral position irrespective of the position of said casing, said element being movable in either direction from said neutral position in response to flow of fluid through said opening.

11. A flow indicator, comprising a casing having a flow opening therethrough, a movable element within said opening and spaced from the walls of said casing, and a single spring directly engaging said element to yieldably urge the same toward a neutral position irrespective of the position of said casing, said element being movable in either direction from said neutral position in response to flow of fluid through said opening, and said spring exerting substantially the same resistance against movement of said element in either direction.

12. In liquid flow indicating mechanism, the combination with a casing having a transparent portion, of a movable indicating vane within said casing and visible through the transparent portion thereof, and means for mounting and maintaining said vane in operative position within said casing, said means comprising a spider, a rod supported thereby, and means supported by said rod for spacing said vane from said spider, said vane being movable relative to said rod.

13. In liquid flow indicating mechanism, the combination with a tube having a transparent portion, of a movable indicating vane within said tube and visible through said transparent portion, and means for movably mounting said vane whereby it occupies an operative position intermediate the ends of the tube, said mounting means comprising spaced-apart spiders, a rod connecting said spiders, and means supported by said rod for spacing said vane intermediate said spiders, said vane being movable relative to said rod.

14. In liquid flow indicating mechanism, the combination with a tube having a transparent portion, of spaced-apart spiders in said tube, a rod rigidly connecting said spiders, an indicating vane visible through said transparent portion and movable relative to said rod for flow indicating purposes, and means for maintaining said vane in operative position intermediate and spaced from said spiders, said means being supported by said rod.

In testimony whereof, the signature of the inventor is affixed hereto.

WILLIAM H. LIEBER.